(12) United States Patent
Ninomiya et al.

(10) Patent No.: US 9,141,115 B2
(45) Date of Patent: Sep. 22, 2015

(54) PRESSURE REDUCING VALVE

(75) Inventors: Makoto Ninomiya, Kobe (JP); Kaoru Nomichi, Ono (JP); Yutaka Suzuki, Kobe (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 0 days.

(21) Appl. No.: 13/881,388

(22) PCT Filed: Oct. 18, 2011

(86) PCT No.: PCT/JP2011/005820
§ 371 (c)(1),
(2), (4) Date: Jun. 10, 2013

(87) PCT Pub. No.: WO2012/056647
PCT Pub. Date: May 3, 2012

(65) Prior Publication Data
US 2013/0263942 A1    Oct. 10, 2013

(30) Foreign Application Priority Data

Oct. 25, 2010  (JP) ................................. 2010-238099

(51) Int. Cl.
*F16K 31/12*    (2006.01)
*G05D 16/10*    (2006.01)
*F16K 17/30*    (2006.01)

(52) U.S. Cl.
CPC .............. *G05D 16/106* (2013.01); *F16K 17/30* (2013.01); *G05D 16/10* (2013.01); *Y10T 137/7793* (2015.04)

(58) Field of Classification Search
CPC ............... Y10T 137/7804; Y10T 137/781; Y10T 137/7811; Y10T 137/7812; Y10T 137/7813; Y10T 137/7793; G05D 16/106; G05D 16/10; F16K 17/30

USPC .......... 137/505.21, 505.27, 505.28, 505.29, 137/505.3; 384/50–59
See application file for complete search history.

(56) References Cited

U.S. PATENT DOCUMENTS 4,215,903 A * 8/1980 Andrews ...................... 384/114
4,303,094 A * 12/1981 Rothwell et al. ............. 137/375

(Continued)

FOREIGN PATENT DOCUMENTS

CN    101116799    2/2008
CN    101449071    6/2009

(Continued)

OTHER PUBLICATIONS

Jul. 23, 2014 Office Action issued in Chinese Patent Application No. 201180031274.1 (with partial English Translation).

(Continued)

*Primary Examiner* — Jessica Cahill
(74) *Attorney, Agent, or Firm* — Oliff PLC

(57) ABSTRACT

The present invention provides a pressure reducing valve having excellent responsiveness, durability, and reliability and stable output characteristics. A pressure reducing valve includes a housing, and the housing includes a valve passage connected to a primary port and a secondary port. A valve element is provided in the housing. The valve element can adjust an opening degree of the valve passage by moving between a closed position where the valve element closes the valve passage and an open position where the valve element opens the valve passage. The valve element is pressed toward the closed position by secondary pressure. A spring member is provided to bias the valve element toward the open position against the secondary pressure. Further, a rolling bearing is provided on the valve element, and the valve element is movably supported by the rolling bearing.

8 Claims, 6 Drawing Sheets

(56) References Cited

U.S. PATENT DOCUMENTS

| | | | | |
|---|---|---|---|---|
| 5,259,414 | A * | 11/1993 | Suzuki | 137/625.65 |
| 7,458,723 | B2 * | 12/2008 | Menges | 384/51 |
| 7,481,241 | B2 * | 1/2009 | Carpenter et al. | 137/505.25 |
| 7,798,169 | B2 * | 9/2010 | Tai | 137/505.28 |
| 2005/0211306 | A1 * | 9/2005 | Dulac | 137/505.38 |
| 2010/0065124 | A1 * | 3/2010 | Samaroo | 137/1 |

FOREIGN PATENT DOCUMENTS

| | | | |
|---|---|---|---|
| CN | 101625043 | | 1/2010 |
| GB | 1292175 | A * | 10/1972 |
| JP | 9-185419 | | 7/1997 |
| JP | 2003-150249 | | 5/2003 |
| JP | 2005-4553 | | 1/2005 |
| JP | 2005-227867 | | 8/2005 |

OTHER PUBLICATIONS

Nov. 22, 2011 International Search Report issued in International Patent Application No. PCT/JP2011/005820.

* cited by examiner

PRESSURE REDUCING VALVE

TECHNICAL FIELD

The present invention relates to a pressure reducing valve configured to reduce the pressure of an operating fluid on a primary port side and supply the operating fluid to a secondary port side.

BACKGROUND ART

A device configured to use a gas, such as a compressed natural gas or a hydrogen gas, is supplied with a fuel gas from a gas supply source of high pressure in light of the conveyance efficiency and the amount of storage, reduces the pressure of the supplied fuel gas up to working pressure or pressure equal to or lower than withstand pressure, and uses the obtained fuel gas. Therefore, a pressure reducing valve configured to reduce the pressure of the gas to the working pressure or the like is provided between the gas supply source and the device. One example of the pressure reducing valve is a pressure reducing valve described in PTL 1.

The pressure reducing valve described in PTL 1 includes a main body. An opening is formed in the main body, and a valve element is provided in the main body. The valve element is slidably supported by the main body and can perform a reciprocating movement between a closed position where the valve element closes the opening and an open position where the valve element opens the opening. The valve element receives secondary pressure toward the closed position, is biased by a spring toward the open position, and is located at a position where the acting force of the secondary pressure and the biasing force of the spring balance. On this account, the reduced secondary pressure is maintained at substantially constant set pressure corresponding to the biasing force of the spring.

CITATION LIST

Patent Literature

PTL 1: Japanese Laid-Open Patent Application Publication No 2005-4553

SUMMARY OF INVENTION

Technical Problem

In the pressure reducing valve described in PTL 1, the tip end portion and rear end portion of the valve element are respectively supported by first and second cylinders, and the valve element and the cylinders may contact one another. Therefore, when the valve element repeatedly performs the reciprocating movement in order to adjust the secondary pressure, wear of seizure may occur on a contact surface between the valve element and the cylinder. On this account, the durability of the valve element cannot be adequately secured. Moreover, if frictional resistance to be specific, sliding resistance) generated when the valve element slides increases by, for example, the contact of the valve element with the cylinder, force in a direction against a movement direction of the valve element increases. Thus, the responsiveness of the valve element deteriorates, and the stability and pressure adjustment accuracy of the secondary pressure deteriorate.

Here, one idea for avoiding the contact between the valve element and the cylinder is to increase a clearance between the valve element and the cylinder. However, in this case, the valve element inclines or is decentered, and uneven wear of an O ring and galling between the valve element and the cylinder easily occur. Thus, the durability of the pressure reducing valve deteriorates.

Here, an object of the present invention is to provide a pressure reducing valve having excellent responsiveness, durability, and reliability and stable output characteristics.

Solution to Problem

A pressure reducing valve of the present invention includes: a housing including a valve passage connected to a primary port and a secondary port; a valve element provided in the housing, configured to adjust an opening degree of the valve passage by moving between a closed position where the valve element closes the valve passage and an open position where the valve element opens the valve passage, and configured to be pressed by secondary pressure toward the closed position; a biasing member configured to bias the valve element toward the open position against the secondary pressure; and a rolling bearing configured to be externally fitted on the valve element and support the valve element such that the valve element is movable.

According to the present invention, since the valve element is point-supported by the rolling bearing, the sliding resistance acting on the valve element is smaller than that acting on the pressure reducing valves of the conventional technologies. In addition, since the rolling bearing is externally fitted on the valve element, the clearance between the rolling bearing and the valve element is small, and this can reduce the inclination and decentering of the valve element. With this, the sliding resistance can be prevented from partially increasing by the contact of the valve element with the housing, and the reliability of the pressure reducing valve can be increased. Since the sliding resistance with respect to the valve element can be reduced as above, the valve element can quickly respond and move with respect to the change in the secondary pressure. Thus, the responsiveness with respect to the change in the secondary pressure can be improved. Moreover, since the inclination and decentering of the valve element can be suppressed, the galling between the valve element and the housing can be suppressed, and the durability of the pressure reducing valve can be improved. Thus, it is possible to provide the pressure reducing valve having excellent responsiveness, durability, and reliability and stable output characteristics.

In the above invention, it is preferable that a clearance between the valve element and the housing be larger than a clearance between the valve element and the rolling bearing.

According to the above configuration, the housing and the valve element can be prevented from contacting each other. With this, the valve element can be prevented from wearing by the contact with the housing. Thus, the durability of the pressure reducing valve can be further improved.

In the above invention, it is preferable that the rolling bearing be externally fitted on the valve element so as to cover a gravity center of the valve element.

According to the above configuration, since the rolling bearing is provided in the vicinity of the gravity center of the valve element, inertial force applied to the valve element can be reduced, and a support mechanism which is hardly influenced by disturbances can be realized.

In the above invention, it is preferable that: the housing include a secondary pressure chamber to which the secondary pressure is introduced from the valve passage and a bearing accommodating space in which the rolling bearing is accommodated; and the hearing accommodating space be isolated from the secondary pressure chamber and the valve passage by a sealing member.

According to the above configuration, the rolling bearing is not exposed to the operating fluid in the valve passage or the secondary pressure chamber. Therefore, a corrosive fluid which corrodes the rolling bearing can be used as the operating fluid. Thus, the use of the pressure reducing valve increases. In addition, matters existing in the bearing accommodating space can be prevented from being mixed with the operating fluid and flowing to the downstream side of the pressure reducing valve. Therefore, for example, even in a device which requires the cleanliness of the operating fluid on the downstream side, lubricant, such as grease, may be used for the rolling bearing.

In the above invention, it is preferable that: the rolling bearing include a tubular bushing fixed to the housing and externally attached to the valve element and a plurality of balls accommodated in the bushing: the plurality of balls be provided so as to contact the valve element and rotate; inward flanges be respectively formed on both end portions of the bushing so as to prevent the balls from getting out of the bushing; and the bushing include a supply hole through which lubricant is able to be supplied to an inside of the bushing from an outside of the bushing.

According to the above configuration, the lubricant can be supplied to the inside of the bushing from the outside of the bushing. Therefore, the lubricant in the bushing can be prevented from drying up. Thus, the durability of the pressure reducing valve can be further improved.

Advantageous Effects of Invention

The present invention can provide the pressure reducing valve having excellent responsiveness, durability, and reliability and stable output characteristics.

The above object, other objects, features and advantages of the present invention will be made clear by the following detailed explanation of preferred embodiments with reference to the attached drawings.

DESCRIPTION OF EMBODIMENTS

Hereinafter, pressure reducing valves 1, 1A, and 1B according to embodiments of the present invention will be explained in reference to the drawings. The concept of upper and lower directions in the embodiments is used for convenience of explanation and does not indicate that the arrangements, directions, and the like of components of the pressure reducing valves 1, 1A, and 1B are limited to the directions. Each of the pressure reducing valves 1, 1A, and 1B explained below is just one embodiment of the present invention, and the present invention is not limited to the embodiments. Additions, deletions, and modifications may be made within the scope of the present invention.

Embodiment 1

Configuration of Pressure Reducing Valve

Figure 1:
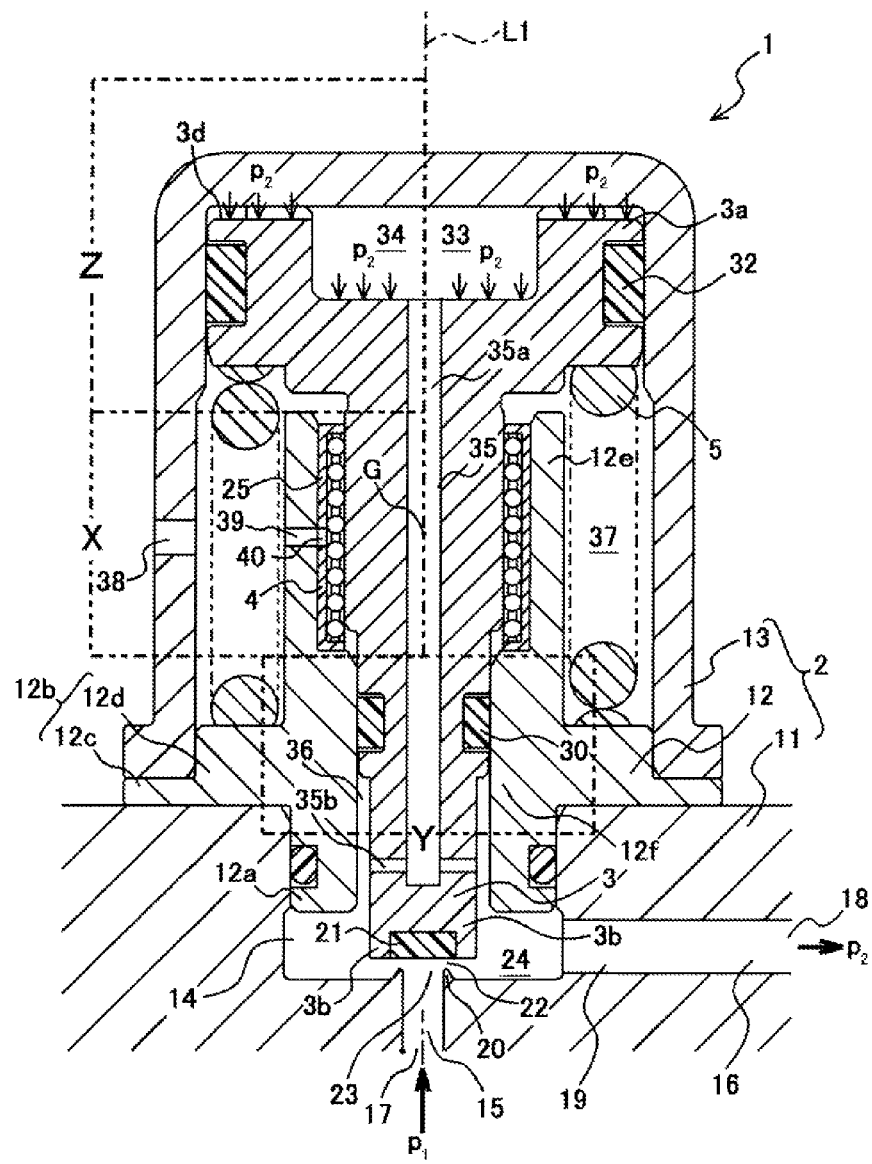
FIG. 1 is a cross-sectional view showing a pressure reducing valve according to Embodiment 1 of the present invention.

A pressure reducing valve 1 is a valve used to reduce the pressure of an operating fluid, mainly a high-pressure gas, to working pressure or atmospheric pressure. The pressure reducing valve 1 is provided and used on a supply passage connected to a gas supply source, such as a high-pressure tank, or on a discharge passage connected to the atmosphere. As shown in FIG. 1, the pressure reducing valve. 1 includes a housing 2, a valve element 3, a rolling bearing 4, and a spring member 5.

The housing 2 is constituted by three members that are a housing block 11, a supporting portion 12, and a cover 13. An insertion hole 14 that is a bottomed hole is formed on the housing block 11. A primary passage 15 is formed on a bottom portion defining the insertion hole 14, and a secondary passage 16 is formed on a side surface portion defining the insertion hole 14. The primary passage 15 is connected to a primary port 17, and the secondary passage 16 is connected to a secondary port 18. The primary passage 15, the secondary passage 16, a below-described primary region 23, and a below-described secondary region 24 (these regions 23 and 24 are contained in the insertion hole 14) constitute a valve passage 19. The supporting portion 12 of the housing 2 is inserted into the insertion hole 14 to threadedly engage with the insertion hole 14.

The supporting portion 12 has a substantially cylindrical shape. A tip end portion 12a of the supporting portion 12 is inserted into the insertion hole 14 to threadedly engage with the insertion hole 14 in a sealed state. The supporting portion 12 includes a flange 12b at an intermediate portion thereof, the flange 12b extending in a radially outward direction. A lower surface of the flange 12b is in contact with an upper surface of the housing block 11. The flange 12b is configured such that a spring receiving portion 12d that is a portion of the flange 12b other than an outer peripheral edge portion 12c is thicker than the outer peripheral edge portion 12c. The cover 13 threadedly engages with an outer peripheral portion of the spring receiving portion 12d.

The cover 13 has a substantially bottomed cylindrical shape. The cover 13 is located so as to accommodate a portion of the supporting portion 12, the portion projecting from the housing block 11. An opening edge of the cover 13 is in contact with an upper surface of the outer peripheral edge portion 12c of the flange 12b. The valve element 3 is provided in the housing 2, constituted by the three members, so as to be able to perform a reciprocating movement in an upper-lower direction along an axis line L1 of the supporting portion 12.

The valve element 3 has a substantially columnar shape. A base portion 3a of the valve element 3 projects in the radially outward direction more than a remaining portion of the valve element 3. The remaining portion of the valve element 3 is inserted through the supporting portion 12, and a tip end portion 3b of the valve element 3 projects downward from the tip end portion 12a of the supporting portion 12. The tip end portion 3b faces an opening of the primary passage 15. An annular projection 20 is formed around the opening of the primary passage 15 so as to surround the opening. The valve element 3 includes a seat portion 21 at a position of the tip end portion 3b, the position facing the projection 20. When the valve element 3 is located at an open position (see FIG. 1) where the seat portion 21 and the projection 20 are spaced apart from each other, the valve passage 19 opens, and an orifice 22 is formed between the seat portion 21 and the projection 20. The insertion hole 14 is divided by the orifice 22 into the primary region 23 located on an inner side of the orifice 22 and the secondary region 24 located on an outer side of the orifice 22. When the seat portion 21 is seated on the projection 20 (that is, the valve element 3 is located at a closed position), the orifice 22 is closed. Thus, the valve element 3 closes between the primary region 23 and the secondary region 24, and the valve passage 19 is closed. The rolling bearing 4 is externally fitted on the valve element 3 configured to open and close the valve passage 19 as above.

The rolling bearing 4 is a so-called linear ball guide. Although a detailed configuration of the rolling bearing 4 will be described below the rolling bearing 4 has a substantially cylindrical shape. The rolling bearing 4 is accommodated in a bearing accommodating space 25. The bearing accommodating space 25 is a cylindrical space formed between the supporting portion 12 and the valve element 3. An inner peripheral portion of a base end portion 12e of the supporting portion 12 is larger in diameter than a remaining portion of the supporting portion 12, and the bearing accommodating space 25 is formed thereat. The rolling bearing 4 accommodated in the bearing accommodating space 25 is fittingly inserted in an inner peripheral portion of the supporting portion 12 to be interposed between the supporting portion 12 and the valve element 3. The rolling bearing 4 supports the valve element 3 such that the valve element 3 can perform the reciprocating movement in the upper-lower direction along, the axis line L1. The rolling bearing 4 supporting the valve element 3 as above is located so as to cover a center portion of the valve element 3, to be specific, cover a center-of-gravity point G of the valve element 3 from outside in the radial direction. Thus, the roll bearing 4 prevents the tilting of the valve element 3 in left, right, front, and rear directions (that is in a radially outward direction). Hereinafter, a specific configuration of the rolling bearing 4 will be explained in reference to FIG. 2.

Figure 2:
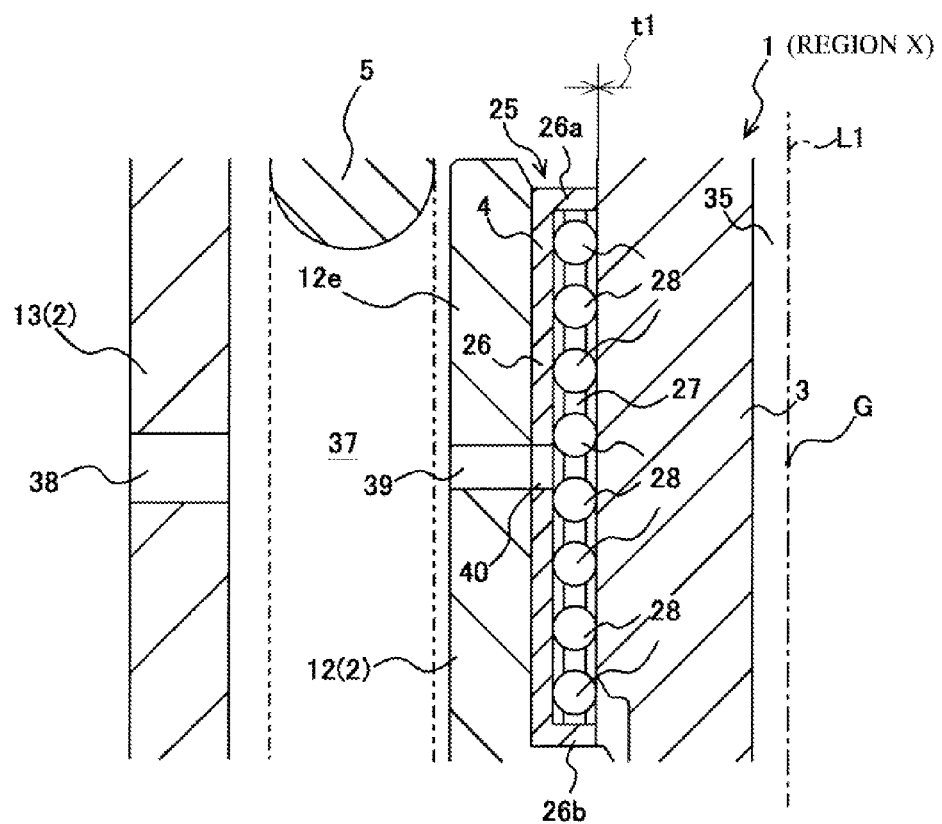
FIG. 2 is an enlarged cross-sectional view of a region X shown in FIG. 1.

As shown in FIG. 2, the rolling bearing 4 includes a bushing 26, a retainer 27, and a plurality of balls 28. The bushing 26 has a substantially cylindrical shape and includes inward flanges 26a and 26b respectively at both opening end portions thereof. Each of the inward flanges 26a and 26b is formed along an entire periphery of the opening end portion in a circumferential direction and extends in the radially inward direction. The retainer 27 having a cylindrical shape is interposed between these two inward flanges 26a and 26b. A plurality of holes are formed on the retainer 27, and the balls 28 are respectively, rotatably fitted in the holes. The plurality of balls 28 are lined up in parallel with the axis line L1, and the lines of the balls 28 are located at regular intervals along the entire periphery of the retainer 27 in the circumferential direction.

The bushing 26 of the rolling bearing 4 configured as above is fittingly inserted in and fixed to the supporting portion 12. The plurality of balls 28 are provided so as to contact an inner peripheral surface of the bushing 26 and an outer peripheral surface of the valve element 3. When the valve element 3 moves in the upper-lower direction, the plurality of balls 28 rotate such that the valve element 3 smoothly moves in the upper-lower direction. However, the rolling bearing 4 is not limited to the above structure. For example, the rolling bearing 4 may be a linear guide configured such that a plurality of circular grooves are formed on an inner peripheral surface of the retainer 27, the plurality of balls 28 are rotatably provided in the circular grooves, and the balls 28 rotate along, the circular grooves.

Figure 3:
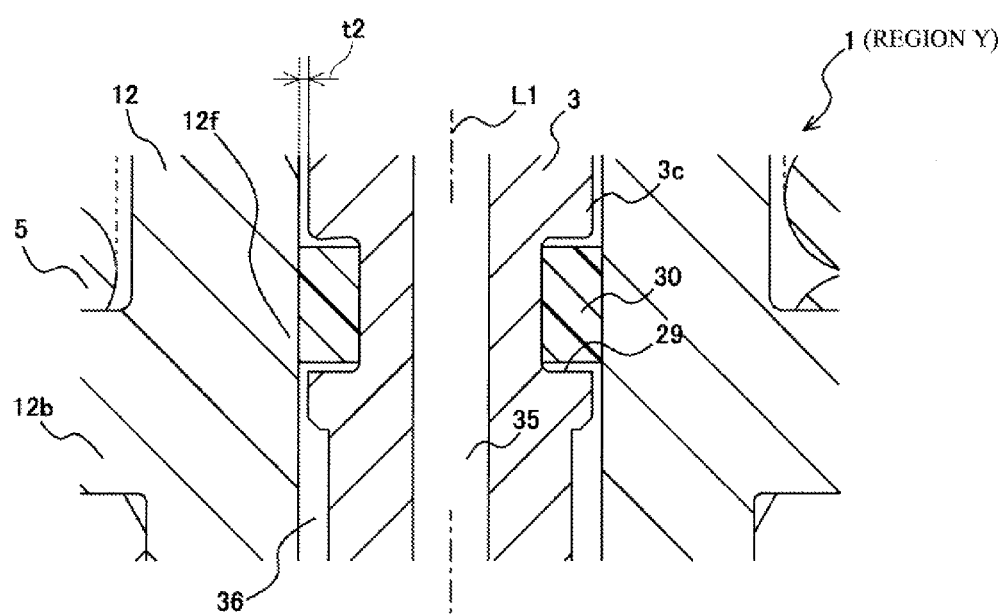
FIG. 3 is an enlarged cross-sectional view of a region Y shown in FIG. 1.
Figure 4:
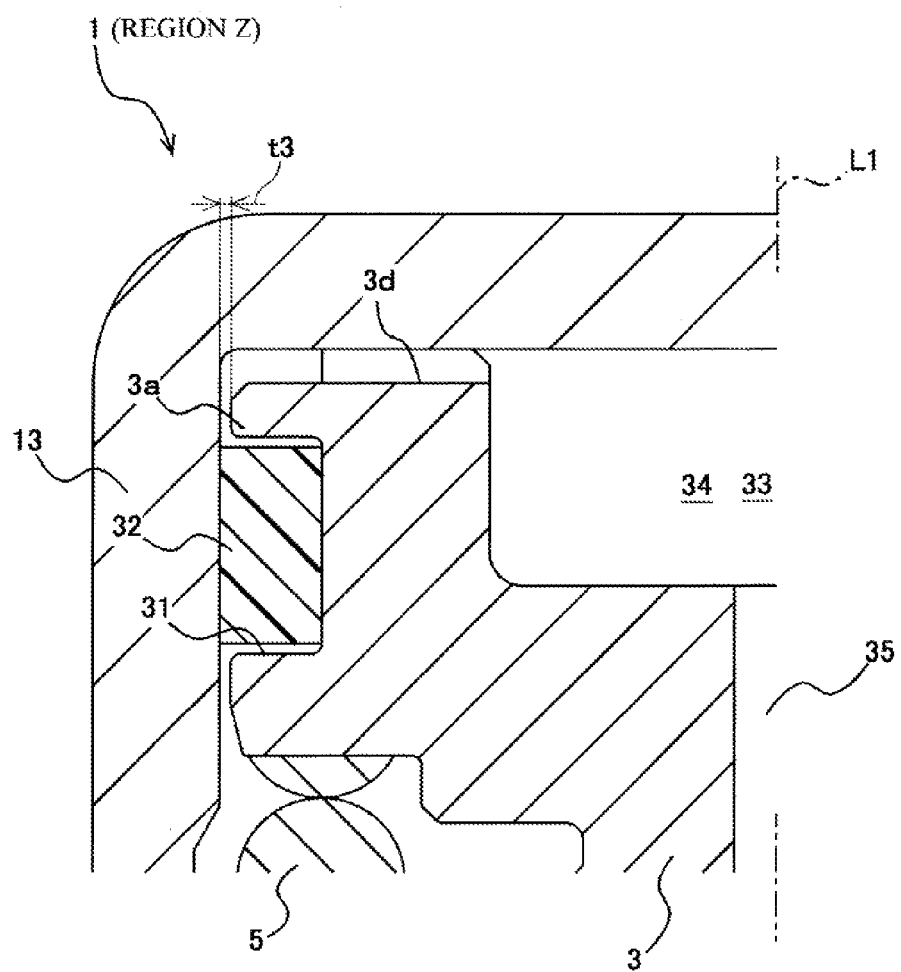
FIG. 4 is an enlarged cross-sectional view of a region Z shown in FIG. 1.

As shown in FIGS. 3 and 4, each of a clearance t2 between the tip end portion 3b of the valve element 3 and the housing 2 and a clearance t3 between the base portion 3a of the valve element 3 and the housing 2 is larger than a clearance t1 between the rolling bearing 4 and the valve element 3. More specifically, an outer diameter of a portion (hereinafter simply referred to as a "sealing portion") 3c of the valve element 3 is smaller than an outer diameter of a center portion of the valve element 3, the sealing portion 3c being located on the tip end portion 3b side of the center portion of the valve element 3, the rolling bearing 4 being externally fitted on the center portion of the valve element 3 (see FIG. 1). In addition, the outer diameter of the sealing portion 3c of the valve element 3 is smaller than an inner diameter of a small-diameter portion 12f of the supporting portion 12. As shown in FIG. 3, the clearance t2 larger than the clearance t1 is formed between an outer peripheral portion of the sealing portion 3c and the small-diameter portion 12f. By this clearance t2, the sealing portion 3c is prevented from contacting the small-diameter portion 12f of the supporting portion. 12. A first seal groove 29 is formed on the outer peripheral portion of the sealing portion 3c along the entire periphery of the outer peripheral portion in the circumferential direction. A first sealing member 30 is fitted in the first seal groove 29 and seals between the sealing portion 3c and the supporting portion 12.

As shown in FIG. 4, an outer diameter of the base portion 3a of the valve element 3 is smaller than an inner diameter of the cover 13, and the clearance t3 larger than the clearance t1 is formed between an outer peripheral portion of the base portion 3a and an inner peripheral portion of the cover 13. With this, the base portion 3a of the valve element 3 can be prevented from contacting the cover 13. A second seal groove 31 is formed on the outer peripheral portion of the base portion 3a along the entire periphery of the outer peripheral portion in the circumferential direction. A second sealing member 32 is fitted in the second seal groove 31 and seals between the base portion 3a and the cover 13.

Further, a recess 33 extending along the axis line of the valve element 3 is formed on the base portion 3a of the valve element 3. A secondary pressure chamber 34 including the recess 33 is formed between the base portion 3a of the valve element 3 and the cover 13 (specifically, a ceiling of the cover 13). The secondary pressure chamber 34 is isolated from a below-described spring accommodating chamber 37 by the second sealing member 32. The secondary pressure chamber 34 is connected to the secondary region 24 through a communication hole 35 formed on the valve element 3 and an annular passage 36.

As shown in FIG. 1, the communication hole 35 includes a communication portion 35a and a connection portion 35b. The communication portion 35a extends along the axis line of the valve element 3 from the bottom of the recess 33. A tip end portion of the communication hole 35 is located in front of the tip end portion 3b of the valve element 3, and the connection portion 35b is connected to the tip end: portion of the communication hole 35. The connection portion 35b extends in the radial direction so as to penetrate the valve element 3. Both ends of the section portion 35b are open on an outer peripheral portion of the valve element 3 and on the tip end portion 3b side of the sealing portion 3c. A portion of the valve element 3 located on the tip end portion 3b side of the sealing portion 3c is formed to have a small diameter. The annular passage 36 is formed between an inner peripheral surface of the supporting portion 12 and the portion located on the tip end portion 3b side of the sealing portion 3c. The communication hole 35 is connected to the secondary region 24 through the annular passage 36. The secondary region 24 and the secondary pressure chamber 34 communicate with each other through the annular passage 36 and the communication hole 35. A base end of the valve element 3 faces the secondary pressure chamber 34.

The base end of the valve element 3 forms a pressure receiving surface 3d configured to receive pressure of the operating fluid introduced to the secondary pressure chamber 34. The valve element 3 is pressed toward the closed position by the pressure (that is, pressing force) received by the pressure receiving surface 3d. The spring member 5 biases the valve element 3 toward the open position against the pressing force of the secondary pressure.

The spring member 5 is a so-called compression coil spring and is provided in the housing 2. In the housing 2, an annular spring accommodating chamber 37 is formed between an outer peripheral surface of the supporting portion 12 and an inner peripheral surface of the cover 13, and the spring member 5 in a compressed state is accommodated in the spring, accommodating chamber 37. A lower end portion and upper end portion of the spring member 5 are respectively in contact with an upper surface of the spring receiving portion 12d of the supporting portion 12 and a lower surface of the base portion 3a and biases the valve element 3 toward the open position.

The spring accommodating chamber 37 is open to the atmosphere through an atmosphere communication hole 38 formed on the cover 13. The spring accommodating chamber 37 is connected to the bearing accommodating space 25 through between the base end portion 12e of the supporting portion 12 and the base portion 3a. The spring accommodating chamber 37 and the bearing accommodating space 25 connected to each other as above are isolated from the secondary region 24 (to be specific, the valve passage 19) by the first sealing member 30 and is isolated from the secondary pressure chamber 34 by the second sealing member 32. To be specific, the spring accommodating chamber 37 and the bearing accommodating space 25 are isolated from the regions to which the operating fluid is introduced and are open to the atmosphere. With this, since the rolling bearing 4 is not exposed to the operating fluid, a corrosive fluid (for example, a hydrogen gas or a sulfur gas) which corrodes the rolling bearing 4 can be used as the operating fluid. Thus, the use of the pressure reducing valve 1 increases. In addition, matters existing in the bearing accommodating space 25 do not flow out to the secondary pressure chamber 34 and the secondary region 24. Therefore, the matters are prevented from being mixed with the operating fluid and flowing to the downstream side of the pressure reducing valve 1. With this, for example, even in a device which requires the cleanliness of the operating fluid on the downstream side, lubricant, such as grease, may be used for the rolling bearing 4.

In the rolling hearing 4, the balls 28 just rotate in the same places (that is, in the holes of the retainer 27). Therefore, the lubricant applied to the balls 28 is unlikely to dry up. However, the lubricant decreases by the long-term continuous usage. Since the openings of both end portions of the bushing 26 are closed by the inward flanges 26a and 26b, it is difficult to supply the lubricant through the openings. However, since supply holes 39 and 40 are respectively formed on the supporting portion 12 and the bushing 26 so as to connect the spring accommodating chamber 37 and the inside of the bushing 26, the lubricant can be supplied to the inside of the bushing 26 through the supply holes 39 and 40. With this, the lubricant can be easily supplied to the inside of the bushing 26 from the outside after the assembly, and the balls 28 can be lubricated at all times.

Operations of Pressure Reducing Valve

Hereinafter, operations of the pressure reducing valve 1 when reducing the pressure of the operating fluid, such as a high-pressure gas, introduced to the primary port 17 will be explained in reference to FIG. 1. As the operating fluid, a corrosive fluid, such as a sulfur gas, or a non-corrosive fluid, such as high-pressure air, may be used.

The pressure reducing valve 1 is normally open since the valve element 3 is being biased by the spring member 5 in an open direction. The high-pressure gas introduced to the primary port 17 is introduced through the orifice 22 to the secondary region 24. When the high-pressure gas flows through the orifice 22, the pressure of the high-pressure gas is reduced from primary pressure $p_1$ to secondary pressure $p_2$ that is low pressure. Then, the gas is introduced to the secondary region 24 and further flows through the secondary passage 16 and the secondary port 18 to be supplied to a device located on the downstream side.

The low-pressure gas reduced in pressure is introduced to not only the secondary passage 16 but also the secondary pressure chamber 34 through the annular passage 36 and the communication hole 35. With this, the secondary pressure $p_2$ acts on the pressure receiving surface 3d of the valve element 3, and the valve element 3 is pressed by the secondary pressure $p_2$ toward the closed position. With this, the valve element 3 moves to close the orifice 22, that is, moves up to a position where the acting force of the secondary pressure $p_2$ by the pressure receiving surface 3d, the biasing force of the spring member 5, and other force acting on the valve element 3 balance.

For example, when the secondary pressure $p_2$ decreases, the acting force acting on the pressure receiving surface 3d decreases, and the biasing force of the spring member 5 exceeds the acting force acting on the pressure receiving surface 3d. In this case, in order to maintain the balance between the acting force acting on the pressure receiving surface 3d and the biasing force of the spring member 5, the valve element 3 moves toward the open position to open the orifice 22. With this, the secondary pressure $p_2$ increases and is maintained at set pressure.

The pressure reducing valve 1 adopts the rolling bearing 4, and each of the clearances t2 and t3 is formed between the valve element 3 and the housing 2. In the rolling hearing 4, the balls 28 are in contact with the valve element 3, and the clearance t1 between each of the balls 28 and the valve element 3 is substantially zero along the entire periphery in the circumferential direction. Therefore, the decentering and inclination of the valve element 3 can be reduced as compared to those of the pressure reducing valves of the conventional technologies, and the valve element 3 can be prevented from contacting the housing 2. With this, the increase in the sliding resistance can be suppressed, and the reliability of the pressure reducing valve 1 can be improved. By reducing the sliding resistance with respect to the valve element 3, the valve element 3 can quickly respond and move with respect to the change in the secondary pressure $p_2$. Thus, the responsiveness of the valve element 3 with respect to the change in the secondary pressure $p_2$ can be improved.

Especially, a starting friction coefficient of the rolling bearing 4 is small, and the difference between the starting friction coefficient and dynamic friction coefficient of the rolling bearing 4 is small. Therefore, the starting frictional resistance of the pressure reducing valve 1 at the time of start-up (start) can be extremely made smaller than those of the pressure reducing valves of the conventional technologies. On this account, the responsiveness at the time of the start-up (when the valve element 3 starts operating) can be improved by using the rolling hearing 4 in the pressure reducing valve 1.

Further, in the pressure reducing valve 1 of the present embodiment, the opening degree of the orifice 22 (that is the opening degree of the valve passage 19) can be adjusted by moving the valve element 3. Since the sliding resistance with respect to the valve element 3 is small, the secondary pressure $p_2$ can be accurately adjusted to the set pressure. Therefore, the secondary pressure $p_2$ is stable, and the stable output characteristics can be obtained.

Moreover, in the pressure reducing valve 1 of the present embodiment, since the inclination and decentering of the valve element 3 is small, the inclination and decentering of the valve elements 3 of respective products can be prevented from varying. In addition, the first and second sealing members 30 and 32 can be prevented from unevenly wearing and breaking, and the operating fluid can be prevented from leaking into the bearing accommodating space 25. With this, the pressure reducing valve 1 having high reliability and excellent durability can be realized.

Moreover, in the pressure reducing valve 1, the rolling bearing 4 is provided so as to cover the gravity center G of the valve element 3. Therefore, the inclination and decentering of the valve element 3 can be suppressed, and the shaking of the base portion 3a and tip end portion 3b of the valve element 3 relative to the axis line L1 can be suppressed. Since the rolling bearing 4 is provided in the vicinity of the gravity center G of the valve element 3, inertial force applied to the valve element 3 can be reduced, and a support mechanism which is hardly influenced by disturbances can be realized. Further, since each of the clearance t3 between the base portion 3a of the valve element 3 and the housing 2 and the clearance t2 between the tip end portion 3b of the valve element 3 and the housing 2 is larger than the clearance t1 between the valve element 3 and the rolling bearing 4, the valve element 3 can be prevented from wearing by the contact with the housing 2 during the operation. With this, the durability of the pressure reducing valve 1 can be further improved.

Embodiment 2

A pressure reducing valve 1A according to Embodiment 2 of the present invention is similar in configuration to the pressure reducing valve 1 according to Embodiment 1. Therefore, regarding, the pressure reducing valve 1A according to Embodiment 2, only components different from the components of the pressure reducing valve 1 according to Embodiment 1 will be explained, and explanations of the same components are omitted. The same is true for a pressure reducing valve 1B according to Embodiment 3 described below.

Figure 5:
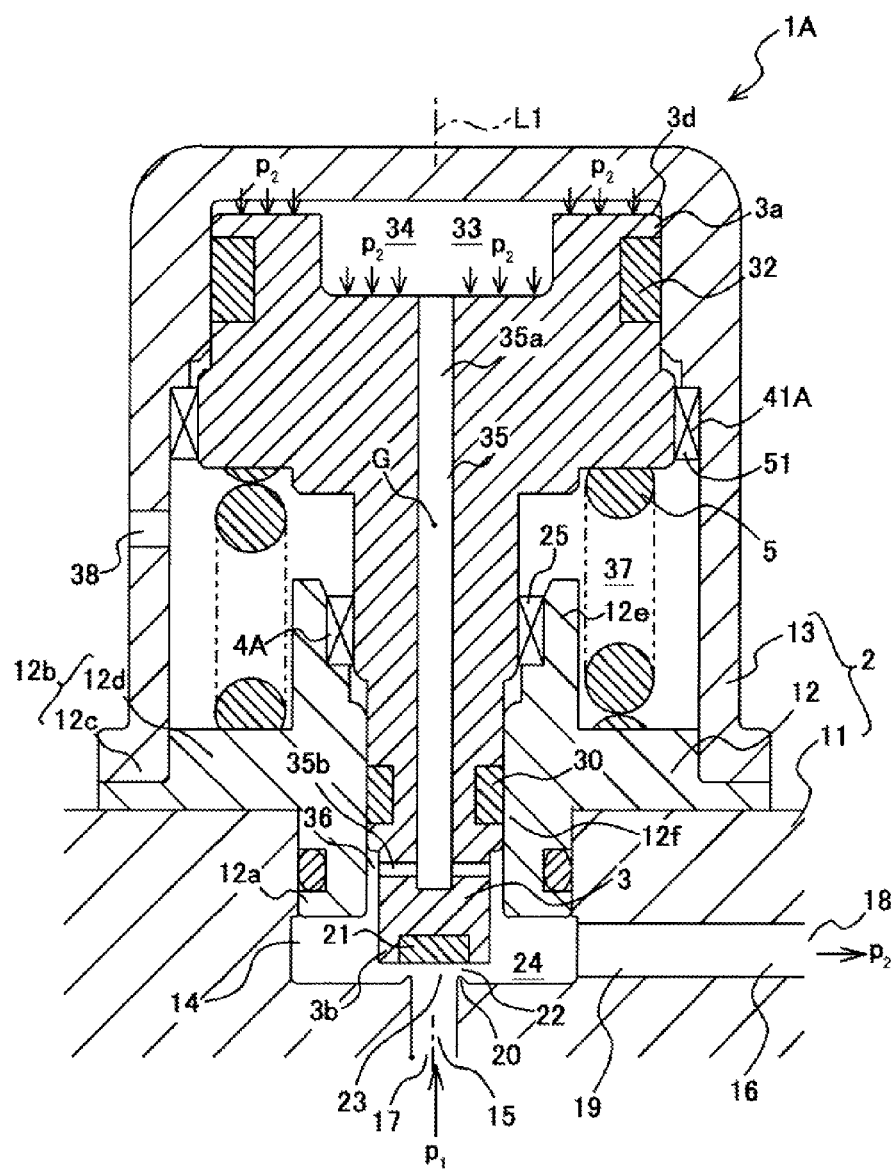
FIG. 5 is a cross-sectional view showing the pressure reducing valve according to Embodiment 2 of the present invention.

As shown in FIG. 5, a rolling bearing 4A included in the pressure reducing valve 1A is shorter than the rolling bearing 4 of Embodiment 1, and the pressure reducing valve 1A includes another rolling bearing 41A in addition to the rolling bearing 4A. A base portion bearing 41A that is another rolling bearing is a so-called linear ball guide and has the substantially same structure as the rolling bearing 4. The base portion bearing 41A is accommodated in a bearing accommodating space 51. The base portion bearing 41A is externally fitted on the base portion 3a of the valve element 3 and is fittingly inserted in the inner peripheral portion of the cover 13. The base portion bearing 41A provided as above is interposed between the cover 13 and the valve element 3 and supports the valve element 3 such that the valve element 3 can perform the reciprocating movement in the upper-lower direction along the axis line L1.

Since the valve element is supported by these two rolling bearings 4A and 41A, the rolling bearings 4A and 41A can be reduced in length, and the linear movement property of the valve element 3 can be secured. Therefore, the axial length of the pressure reducing valve 1A can be reduced.

Other than the above, the pressure reducing valve 1A has the same operational advantages as the pressure reducing valve 1 of Embodiment 1.

Embodiment 3

Figure 6:
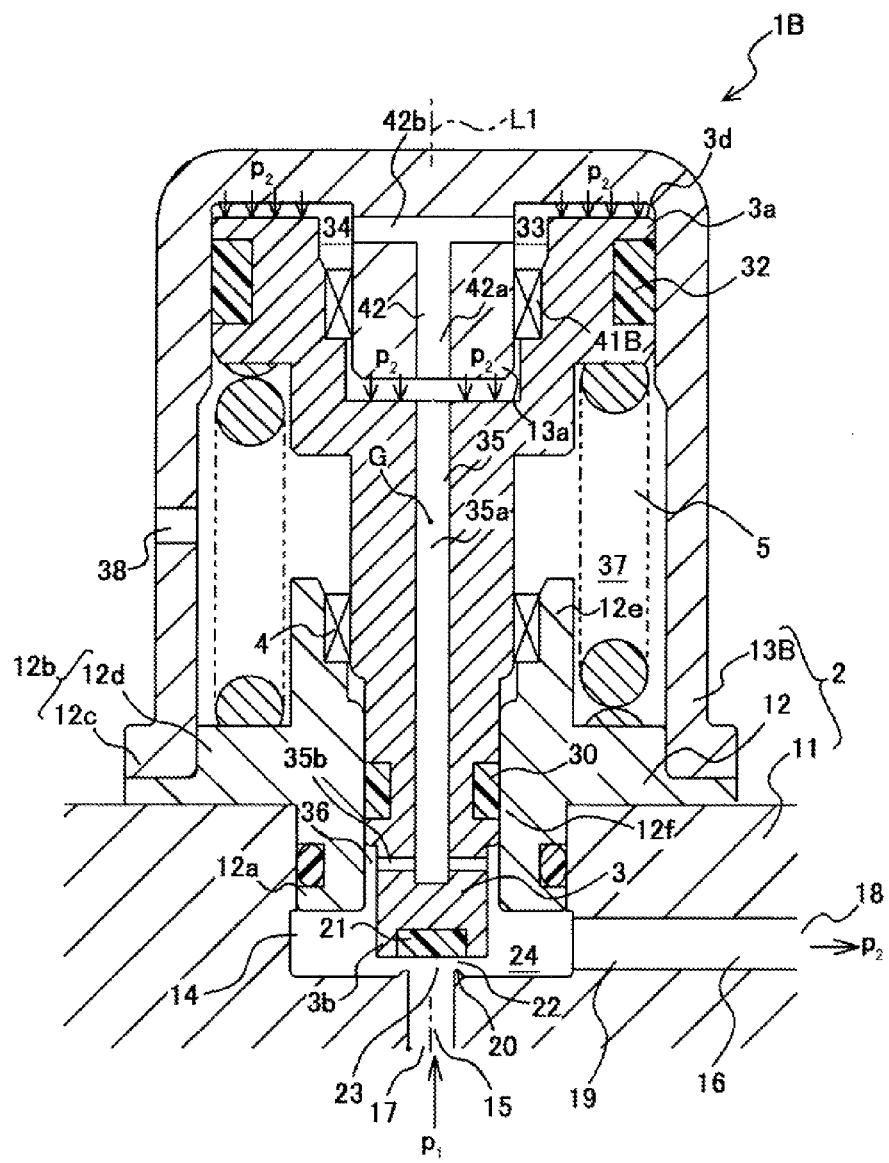
FIG. 6 is a cross-sectional view showing the pressure reducing valve according to Embodiment 3 of the present invention.

As shown in FIG. 6, the pressure reducing valve 1B according to Embodiment 3 of the present invention is similar to the pressure reducing valve 1A according to Embodiment 2. A cover 13B includes a supporting portion 13a at a ceiling portion (to be specific, a bottom portion of a cylinder) thereof, the supporting portion 13a extending downward along the axis line L1. The supporting portion 13a extends in the recess 33 of the valve element 3. A base portion bearing 41B is externally fitted on an outer peripheral portion of the supporting portion 13a. The base portion bearing 41B is fittingly inserted in an inner peripheral portion of the valve element 3, the inner peripheral portion defining the recess 33. The base portion bearing 41B is interposed between the cover 13B and the valve element 3 and supports the valve element 3 such that the valve element 3 can perform the reciprocating movement in the upper-lower direction along the axis line L1.

A bypass passage 42 is formed in the supporting portion 13a. The bypass passage 42 includes a communication portion 42a and a penetrating portion 42b. The communication portion 42a opens on a lower surface of the supporting portion 13a and extends upward along the axis line L1. The penetrating portion 42b is connected to an upper end of the communication portion 42a. The penetrating portion 42b penetrates the supporting portion 13a in the radial direction and opens on an outer peripheral surface of the supporting portion 13a and on an upper side of the base portion bearing 41B. The bypass passage 42 formed as above connects upper and lower portions of the Secondary pressure chamber 34 divided by the base portion bearing 41B and can introduce the secondary pressure, introduced through the communication hole 35, to the pressure receiving surface 3d of the base portion 3a located on an upper side of the base portion bearing 41.

The pressure reducing valve 1B has the same operational advantages as the pressure reducing valve 1A of Embodiment 2.

Other Embodiments

In the pressure reducing valves 1 of Embodiments 1 to 3, the secondary passage 16 is perpendicular to the primary passage 15. However, the secondary passage 16 may be formed on the ceiling portion of the cover 13, and the primary passage 15 and the secondary passage 16 may be arranged on a straight line. Moreover, in order to cancel the primary pressure $p_1$ applied from the operating fluid of the primary region 23, a hack pressure chamber connected to the primary region 23 may be formed in the valve element 3. With this, the influence of the primary pressure $p_1$ is suppressed, and the secondary pressure $p_1$ can be reduced more accurately.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

REFERENCE SIGNS LIST 1 pressure reducing valve
2 housing
3 valve element
4 rolling bearing
5 spring member
17 primary port
18 secondary port
19 valve passage
25 bearing accommodating space
26 bushing
26a inward flange
26b inward flange
28 ball
30 first sealing member
32 second sealing member
34 secondary pressure chamber
37 spring accommodating chamber
38 atmosphere communication hole
39 supply hole
40 supply hole

The invention claimed is:

1. A pressure reducing valve comprising:
a housing including a valve passage connected to a primary port and a secondary port;
a valve element provided in the housing, configured to adjust an opening degree of the valve passage by moving between a closed position where the valve element closes the valve passage and an open position where the valve element opens the valve passage, and configured to be pressed by secondary pressure toward the closed position;
a biasing member configured to bias the valve element toward the open position against the secondary pressure; and
a rolling bearing configured to be externally fitted on the valve element and support the valve element such that the valve element is movable, wherein:
the housing further includes:
a secondary pressure chamber to which the secondary pressure is introduced from the valve passage, and
a bearing accommodating space in which the rolling bearing is accommodated; and
the bearing accommodating space is arranged between the secondary pressure chamber and the valve passage and is isolated from the secondary pressure chamber and the valve passage by a sealing member such that the rolling bearing is not exposed to a fluid in the secondary pressure chamber and the valve passage.

2. The pressure reducing valve according to claim 1, wherein:
the rolling bearing includes a tubular bushing externally attached to the valve element and a plurality of balls accommodated in the bushing;
the plurality of balls are provided so as to contact the valve element and rotate;
inward flanges are respectively formed on both end portions of the bushing so as to prevent the balls from getting out of the bushing; and
the bushing includes a supply hole through which lubricant is able to be supplied to an inside of the bushing from an outside of the bushing.

3. The pressure reducing valve according to claim 1, wherein the rolling bearing is externally fitted on the valve element so as to cover a gravity center of the valve element.

4. The pressure reducing valve according to claim 3, wherein:
the rolling bearing includes a tubular bushing externally attached to the valve element and a plurality of balls accommodated in the bushing;
the plurality of balls are provided so as to contact the valve element and rotate;
inward flanges are respectively formed on both end portions of the bushing so as to prevent the balls from getting out of the bushing; and
the bushing includes a supply hole through which lubricant is able to be supplied to an inside of the bushing from an outside of the bushing.

5. The pressure reducing valve according to claim 1, wherein a clearance between the valve element and the housing is larger than a clearance between the valve element and the rolling bearing.

6. The pressure reducing valve according to claim 5, wherein:
the rolling bearing includes a tubular bushing externally attached to the valve element and a plurality of balls accommodated in the bushing;
the plurality of balls are provided so as to contact the valve element and rotate;
inward flanges are respectively formed on both end portions of the bushing so as to prevent the balls from getting out of the bushing; and
the bushing includes a supply hole through which lubricant is able to be supplied to an inside of the bushing from an outside of the bushing.

7. The pressure reducing valve according to claim 5, wherein the rolling bearing is externally fitted on the valve element so as to cover a gravity center of the valve element.

8. The pressure reducing valve according to claim 7, wherein:
the rolling bearing includes a tubular bushing externally attached to the valve element and a plurality of balls accommodated in the bushing;
the plurality of balls are provided so as to contact the valve element and rotate;
inward flanges are respectively formed on both end portions of the bushing so as to prevent the balls from getting out of the bushing; and
the bushing includes a supply hole through which lubricant is able to be supplied to an inside of the bushing from an outside of the bushing.

* * * * *